Oct. 9, 1951  J. E. LINDBERG, JR  2,570,252
ENGINE POWER ANALYZER RECORDER
Filed April 30, 1948  3 Sheets-Sheet 1

INVENTOR
JOHN E. LINDBERG, JR.
BY
ATTORNEY

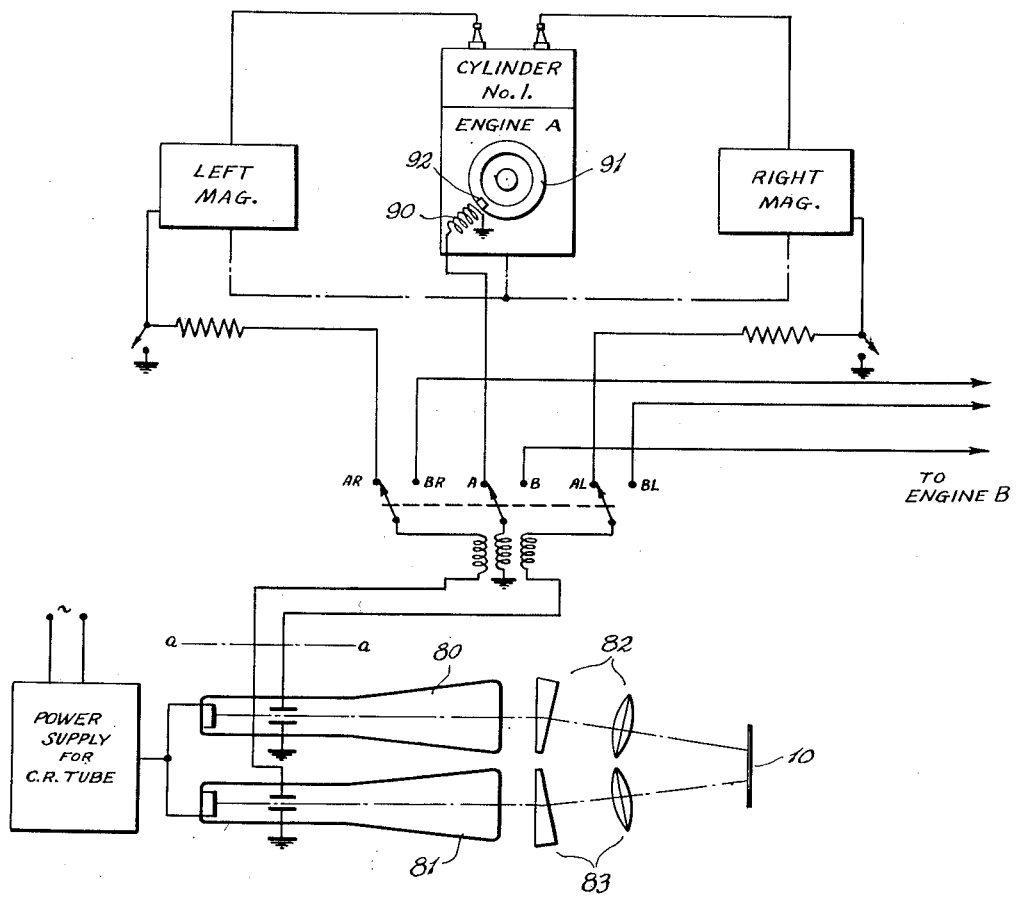
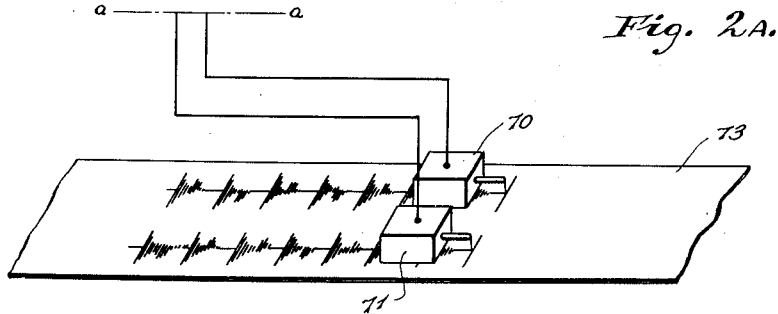

Oct. 9, 1951    J. E. LINDBERG, JR    2,570,252
ENGINE POWER ANALYZER RECORDER

Filed April 30, 1948    3 Sheets-Sheet 3

INVENTOR
JOHN E. LINDBERG, JR.
BY
his ATTORNEY

Patented Oct. 9, 1951

2,570,252

UNITED STATES PATENT OFFICE 2,570,252

ENGINE POWER ANALYZER RECORDER

John E. Lindberg, Jr., Redwood City, Calif.

Application April 30, 1948, Serial No. 24,121

1 Claim. (Cl. 346—33)

This invention relates to improvements in apparatus and methods including means for analyzing power conditions of prime movers having particular reference to internal combustion engine analyzers for determining faults and operating conditions thereof in order to effectively maintain the operation of such engines at maximum power output and efficiency.

Although this invention permits the operation of all internal combustion engines to better advantage, it has special value when used to analyze the operation of aircraft engines either singly or in multiple units, so as to determine their proper operation and capabilities.

The need for simple and accurate means for the detection and location of troubles which develop in aircraft engines has become increasingly apparent. Methods previously used were at best approximate and inconclusive and have remained substantially unchanged since the beginning of the aircraft industry.

In an effort to overcome the limitations of such previous equipment a power plant analyzer is described in my U. S. application Serial No. 748,286, now Patent No. 2,518,427, whereby continuous analysis of complete aircraft power plants either on the ground and/or in flight is provided.

In the copending application there is included pictorial indicating means which enables an aircraft flight engineer to obtain a complete picture of the operating condition of the craft's engine at any time during flight.

By means of this indicator electrical delineations or characterizing patterns are observable as representing conditions of engine vibration, ignition system performance, fuel mixture distribution, etc.

From these characteristic patterns, a flight engineer can detect, locate and identify malfunctions in engine performance, so as to readily offer a means for exactly determining the necessary adjustments to be made either in flight or on the ground.

The present invention is for use with the system disclosed in U. S. application Serial No. 748,286, now Patent No. 2,518,427, but providing means for enabling the use of the power plant analyzer described therein in flight or on the ground in aircraft which would not normally use a flight engineer to read the characteristic patterns formed on the visual indicator.

The present invention provides, in an aircraft, a simple permanent recording means which readily enables the accurate diagnosis of the power plant operations of the engine. By means of the present invention there is disclosed automatic means for obtaining photographs or positive prints of the power plant patterns providing ready means for identifying and determining cylinder operation of the aircraft's engine.

Thus an important feature of the present invention is to provide means for obtaining permanent operational data of an aircraft engine while the aircraft is in flight in an automatic, accurate and continuous manner for later diagnosis by an expert thus avoiding the necessity of carrying an engine expert on the craft to interpret the fleeting cathode ray indications of engine performance furnished by the system of my prior invention.

A prime object therefore of the present invention is to provide a unitary, simple and complete means for recording engine faults so that improved performance in single or multiple engine aircraft may be secured.

A further object of the invention is to provide a recording system for utilization with power plants to identify operating conditions of the engines without the necessity of utilizing synchronizing and phasing apparatus thus providing a simple, inexpensive and compact analyzing means by obviating the need for a horizontal sweep circuit.

Another object of the present invention is to make possible means for readily identifying the operating conditions of aircraft engines while the craft is in flight by means of a permanent recording device.

Still another object of the present invention is to allow for the identification of various malfunctions occurring during engine operation by means of electrical delineations placed upon a recording strip.

The invention in another of its aspects relates to novel features of the instrumentalities described herein for achieving the principal objects of the invention and to novel principles employed in those instrumentalities, whether or not these features and principles are used for the said principal objects or in the said field.

Other objects of the invention and the nature thereof will become apparent from the following description considered in connection with the accompanying drawings wherein like reference characters describe elements of similar function and the scope of the invention is determined from the appended claim.

Referring to the drawings,

Fig. 2 is an alternative embodiment of the invention useful in illustrating a dual lens system adapted for use with the herein disclosed invention;

Fig. 2A shows means for using scribing or an inking pen means in a preferred embodiment of the invention;

The novel power plant analyzer and recorder hereinafter described uses a cathode ray tube to indicate magneto voltage or vibration pickup voltage of a craft's engine.

By means of a spring or motor drive, a light sensitive paper or film, such as a photographic film, is passed at a uniform rate before the face of a cathode ray tube depicting voltage variations. Each exposure of film for each transport period of the film before the cathode ray tube face is predeterminedly marked so as to identify the engine and magneto of the power plant under observation.

Figure 1:
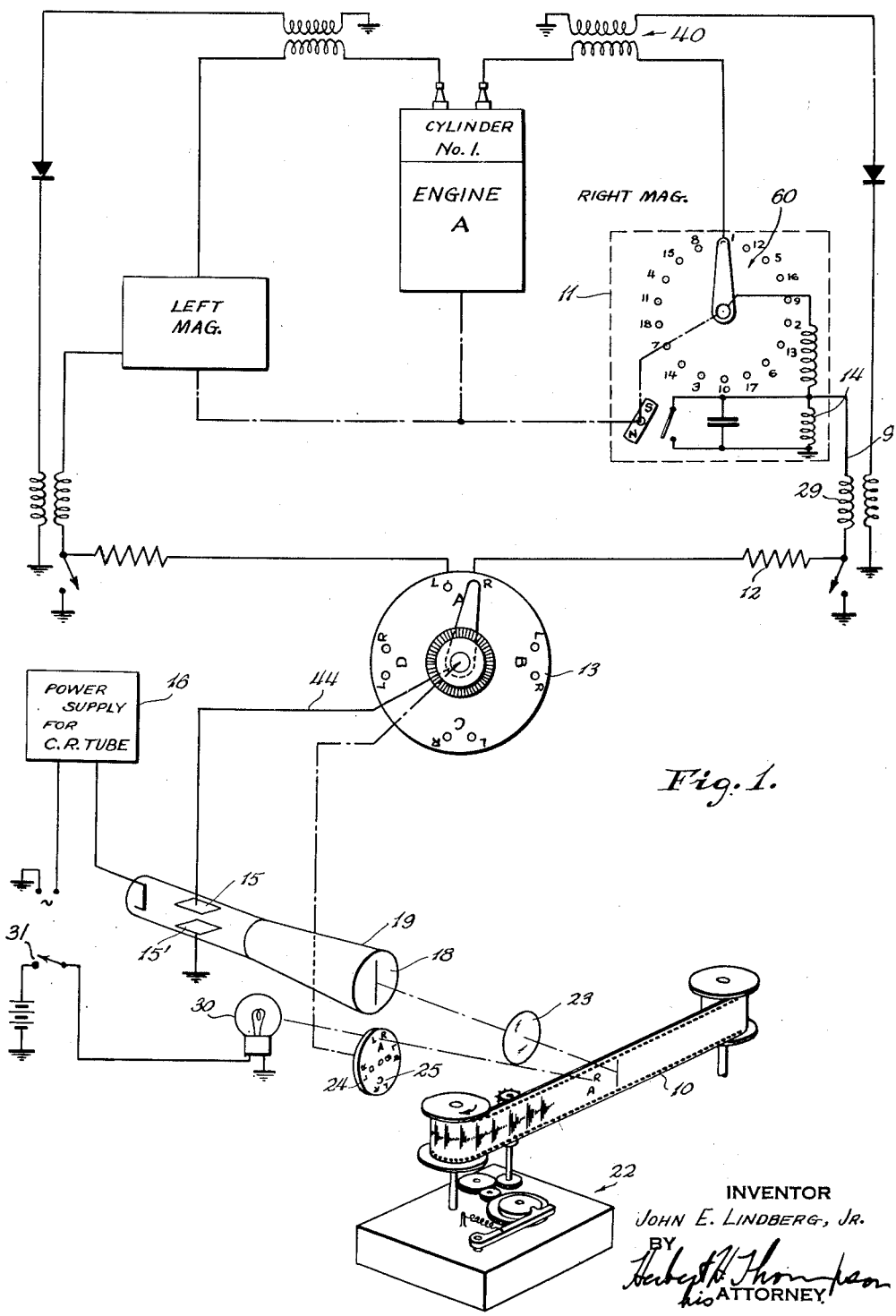
Fig. 1 is an illustration of a preferred embodiment of the herein disclosed invention useful in disclosing the operation features thereof.

As shown in Fig. 1 the ignition analyzer recorder comprises means for recording magneto primary voltages vs. time on a moving photographic film or paper 10. The primary coil 14 of an engine magneto 11, herein shown as being the right magneto of an internal combustion engine A, is connected by means of a suitable conductor 9 through an inductance 29 to a load resistor 12 connected to a magneto-selector switch 13. When the desired magneto is selected by means of switch 13, connection is made via the switch 13 and a further connection 44 to the vertical deflection plates 15, 15' (plate 15' is grounded) of a cathode ray tube 19.

Cathode ray tube 19 has the usual type of power supply 16 necessary to deliver filament, focusing, intensity and accelerating potentials thereto so that a sharp beam of electrons may be projected upon its face 18 creating a visible pattern.

In operation of the present invention when selector switch 13 is placed in a position to make contact with the desired magneto of the engine, voltages from the primary circuit of the selected magneto will cause vertical deflections of the cathode ray beam on face 18 of cathode ray tube 19. Therefore, appearing on the face 18 of the cathode ray tube 19 is an indication having a vertical amplitude deflection which is a function of the magneto primary voltage.

In order to obtain this voltage indication as a plotted graph, photographic film 10 is transported preferably at a uniform rate of speed horizontally in front of face 18 of the cathode ray tube 19. (The transport means utilized in passing the film before the face of the cathode ray tube normally consists of a spring or electrical drive 22 arranged to give a fixed distance of film transport during a predetermined time interval. For example, it has been found that a good rate of speed may be four feet of film passing before the face of the cathode ray tube during a time interval of ½–1 second. For initiating transport action a remote push button control may be afforded. Further, to obtain a desired sharpness of image a focusing lens 23 may be interposed between the face 18 of the cathode ray tube 19 and the film 10.

In order to mark each exposure of film for each transport period so as to identify the engine and magneto under observation a stencilled disc 24, which is positionally coupled to magneto selector switch 13, is provided adjacent the transported film 10 in such manner that suitable identifying marks are provided on the film corresponding to the stencils 25 (L, R etc.) made in the disc 24. Thus, when an electric light bulb 30 is energized by push button 31, photographic film 10 is exposed to the filtrations of light through the stencils 25 in the disc 24. On development of film 10 the stencils 25 will thus appear on film 10 so as to identify the position of switch 13. Such a developed film appears in Fig. 3.

Further, means for identifying each cylinder of the magneto under observation is also provided. To obtain this cylinder identification, means are provided for producing an accentuated pulse on the vertical trace when a predetermined cylinder of the engine is top dead center on the firing cycle of the internal combustion engine. This accentuated pulse may be derived by providing a reactance type pickup 40 associated with distributor 60 of the engine A.

With the top dead center of the firing cylinder thus identified by the accentuated pulse, an index scale 35 depicting the cylinder arrangement of engine A (shown in Fig. 4) may be placed in front or behind the film to define and identify the successive cylinders firing in the engine cycle. When necessary, due to the difference in speed of the transported film shown in Fig. 3A, as compared to the standard reference index scale 35, alignment may be provided by utilization of any optical projection means.

Figure 3:
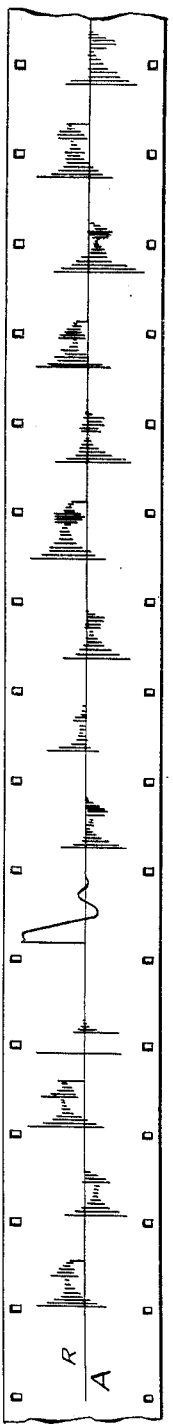
Figs. 3 and 3A are illustrations of a developed film used to permanently record electrical voltage pictures representing operating conditions in the cylinders of an internal combustion engine.
Figure 3A:
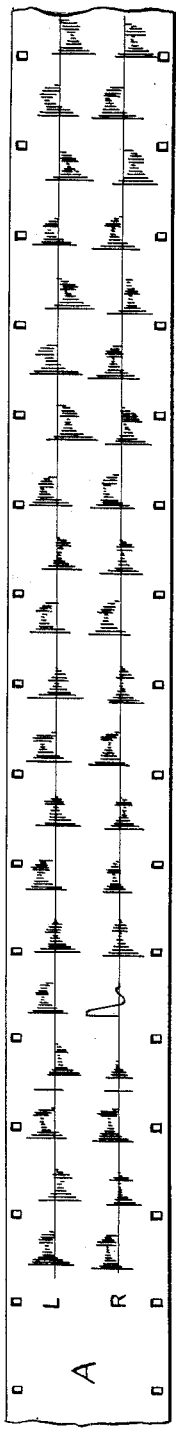
Figure 4:
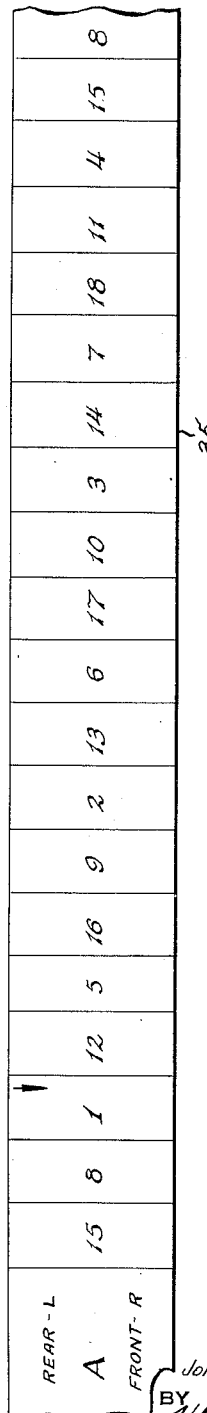
Fig. 4 is an illustration of cylinder index used in the invention to identify the succession of cylinders as arranged in the firing cycle.

When the identifying arrow is properly lined up with the cylinder marker pulse previously described, identification of the cylinders may readily be made by means of the cylinder number arrangement shown on scale 35. The patterns shown in Figs. 3 and 3A are typical of combustion conditions shown in the cylinders of the engine and may be analyzed in substantially the same manner as previously disclosed in U. S. application Serial No. 748,286, now Patent No. 2,518,427.

Fig. 2 shows an arrangement whereby the signals from both right and left magnetos of engine A may be applied to cathode ray tube 80, 81 and wherein by means of a dual lens system 82, 83 two vertical delineators, each from one of the magnetos, may be placed upon the film 10 for ease in comparison. Thus the signals from the two magnetos of a single engine are caused to appear one over the other on the single strip of film 10 as shown in Fig. 3A.

To provide the identifying cylinder marker as previously described, a magnetic pick-off 90 is placed near the flywheel 91 of motor A. Flywheel 91 has a paramagnetic portion 92 which induces a voltage in the pickup to deflect the electronic beam of cathode ray tube 80, 81. Further, as previously described, a scale (Fig. 4) may be used to provide identification of each of the cylinders as they are individually being recorded upon the film strip. A great advantage of this second embodiment is that a complete record of cylinder operation of a single engine is thus obtainable on one strip of the film (Fig. 3A) and hence identification of the magnetos is made more positive and simple.

If it is desired, both from considerations of cheapness and expediency, that photographic film be avoided, alternative means are shown in Fig. 2A whereby deflection voltages derived from the primary circuit of the magneto may be recorded through the use of magnetically operated scribers or pens 70, 71 on a strip of plastic or paper 73.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A device to record indications representative of the operating condition of the ignition system in an internal combustion engine comprising a cathode ray tube, deflecting means for the electron beam in the tube, means to project an image of the electron beam trace on photographic film, actuating means to advance the film to obtain a continuous record of the electron beam trace, means in the ignition system to impress voltage signals produced by the firing of each spark plug on the deflecting means during each engine cycle, means connected to the output of a predetermined spark plug to produce an additional voltage signal when said predetermined plug is fired, and means to combine the additional voltage signal with the signal produced by the firing of the predetermined plug whereby the combined signal is impressed on the deflecting means.

JOHN E. LINDBERG, Jr.

REFERENCES CITED

The following references are of record in the file of this patent:

UNITED STATES PATENTS

| Number | Name | Date |
| --- | --- | --- |
| 1,870,975 | Ulrey | Aug. 9, 1932 |
| 2,186,268 | Pakala | Jan. 9, 1940 |
| 2,200,741 | Gray | May 14, 1940 |
| 2,336,081 | Finnegan, Jr. et al. | Dec. 7, 1943 |
| 2,355,363 | Christaldi | Aug. 8, 1944 |
| 2,366,355 | Roberts | Jan. 2, 1945 |
| 2,428,369 | Kammer | Oct. 7, 1947 |
| 2,430,069 | Mesh | Nov. 4, 1947 |
| 2,444,338 | Dimond | June 29, 1948 |